H. F. SHAW.
Car Truck.

No. 50,282. Patented Oct. 3, 1865.

Witnesses:
N. Ames
Geo. K. Clarke

Inventor:
Harry F. Shaw

UNITED STATES PATENT OFFICE.

HENRY F. SHAW, OF WEST ROXBURY, MASSACHUSETTS.

IMPROVED LOCOMOTIVE-CAR.

Specification forming part of Letters Patent No. 50,282, dated October 3, 1865.

*To all whom it may concern:*

Be it known that I, HENRY F. SHAW, of West Roxbury, in the county of Norfolk and State of Massachusetts, have invented a new and useful Locomotive-Engine Car; and I do hereby declare that the following is a full, clear, and exact description of the construction and operation of the same, reference being had to the accompanying drawings, forming a part of this specification, in which—

Figure 2:
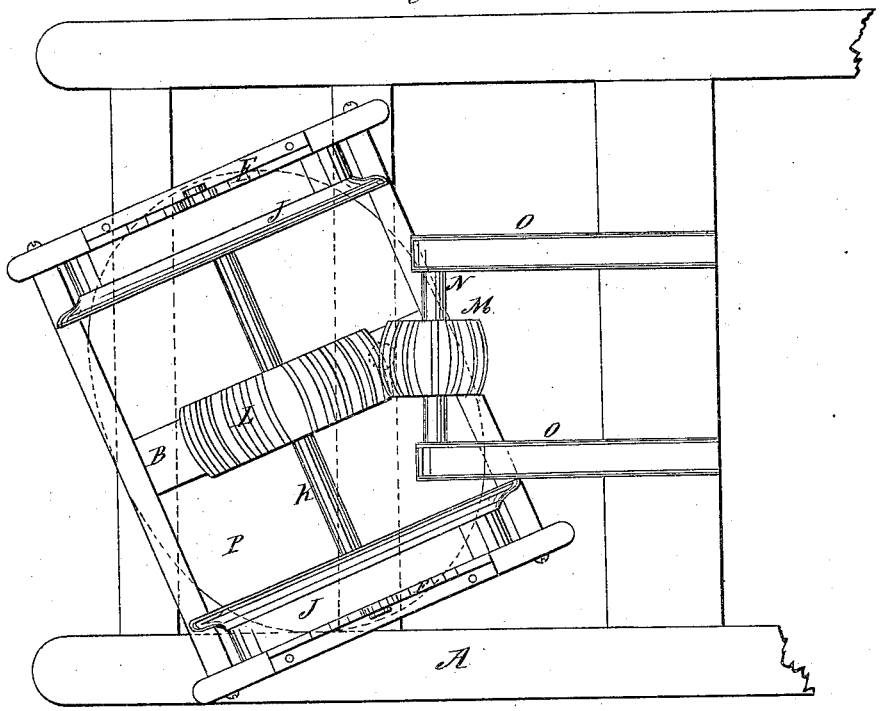
Figure 1:
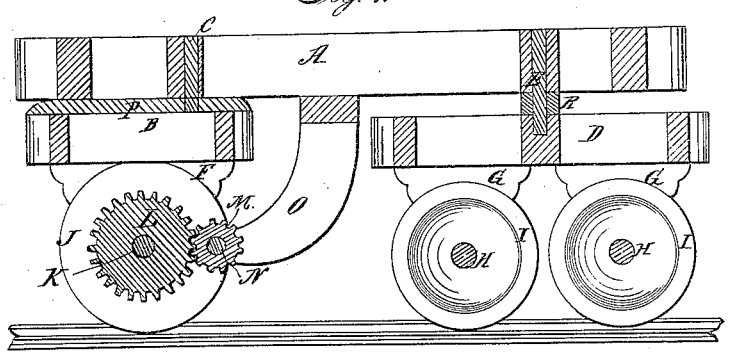

Figure 1 is a longitudinal vertical central section, showing those parts of a locomotive-engine car below the floor, and Fig. 2 is an enlarged plan of the under side of the front truck of the car.

Like parts are indicated by the same letters in both figures.

The design of my invention is to enable a "dummy" or locomotive-engine car to move with freedom around any required curve; and its nature consists in so shaping and arranging the driving-gear wheel (which is actuated by the connecting-rods of the engines) and the gear-wheel which is fast to the axle of the car-wheels, that the latter gear-wheel may turn horizontally the required distance about the former, which object is accomplished by rounding one or both of the said gear-wheels, and arranging the king-bolt in such relation to them that their teeth may always be in proper working contact in whatever position the truck may be turned in relation to the car.

To enable others skilled in the art to make and use my improvement, I will now proceed to describe its construction and operation.

A represents the floor-frame of a car of any required dimensions, in the front end of which the boiler and driving-engines are placed, being separated from the rest of the car by a partition.

D is the hind truck, connected to the car-body by means of the rocker R and king-bolt E, having its hangers G, wheels I, and axles H, with springs, &c., similar to those of other cars of the kind in general use.

B is the front truck-frame, the top of which is provided with an expanded rocker, P, (see dotted lines in Fig. 2,) on which rests the front end of the car.

C is the king-bolt of the truck B.

F F are the hangers, and K the axle, of the wheels J J.

O O are stiff hangers, the upper ends of which are firmly secured to the frame of the bottom of the car.

N is the horizontal crank-shaft of the engines, which are placed above it in the body of the car, and whose connecting-rods play freely through a hole in the bottom of the same. The ends of this crank-shaft turn in suitable boxes in the lower extremities of the hangers O O. The boiler and the engines, with their appendages, forming no part of my improvement, are not represented in the drawings.

M is a gear-wheel fast to the crank-shaft N, and L is a larger gear-wheel fast to the axle K of the truck-wheels L L. The teeth of these gear-wheels, instead of having their outer surfaces square or parallel with the axles N and R, are rounded, as clearly shown in Fig. 2, so that the wheel L may turn horizontally about the wheel M and still retain the teeth in proper working contact; and in order that this may be done with the least amount of friction the king-bolt C should be placed directly over the "pitch line" between the two gear-wheels, and the curve of the teeth should be the arc of a circle whose radius is half, or about half, the distance between the centers of the two wheels; or if of the two wheels L M one be convex and the other concave on their peripheries, so that the one will fit into the other, it is obvious that the same result will be produced—*i. e.*, the truck B can be turned to any required angle with the body of the car without throwing the teeth of the gear-wheels out of working contact. I prefer, however, to round the teeth of both wheels as represented in Fig. 2, as they turn on each other with less friction than they would if one wheel were convex and the other concave.

The truck B is represented as having only two wheels. It is obvious, however, that it may have four wheels, if desirable.

My improvement is very simple, cheap, and strong, and allows of any necessary vertical spring or lateral swaying of the car in relation to the truck, as well as the horizontal movement required in passing round the curves of a railway-track.

Having thus described the construction and operation of my invention, what I claim as new, and desire to secure by Letter Patent, is—

So shaping and arranging the gear-wheel M of the crank-shaft N and the gear-wheel L of the truck-wheel axle that the one may turn horizontally about the other, substantially as set forth and for the purpose described.

Witnesses:     HENRY F. SHAW.
N. AMES,
GEO. K. CLARKE.